(12) United States Patent
Butterworth

(10) Patent No.: US 7,996,716 B2
(45) Date of Patent: Aug. 9, 2011

(54) CONTAINMENT AND RECOVERY OF SOFTWARE EXCEPTIONS IN INTERACTING, REPLICATED-STATE-MACHINE-BASED FAULT-TOLERANT COMPONENTS

(75) Inventor: Henry Butterworth, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 12/137,813

(22) Filed: Jun. 12, 2008

(65) Prior Publication Data

US 2009/0313500 A1 Dec. 17, 2009

(51) Int. Cl.
*G06F 11/00* (2006.01)

(52) U.S. Cl. ............... 714/17; 714/16; 714/41

(58) Field of Classification Search ........... 714/16, 714/17, 41
See application file for complete search history.

(56) References Cited

U.S. PATENT DOCUMENTS

| | | | | |
|---|---|---|---|---|
| 5,857,204 | A * | 1/1999 | Lordi et al. | 707/202 |
| 5,878,056 | A * | 3/1999 | Black et al. | 714/748 |
| 6,339,832 | B1 * | 1/2002 | Bowman-Amuah | 714/35 |
| 6,922,796 | B1 | 7/2005 | Matena et al. | |
| 2004/0177337 | A1 * | 9/2004 | Iida et al. | 717/104 |
| 2005/0283644 | A1 | 12/2005 | Lorch et al. | |
| 2006/0155729 | A1 | 7/2006 | Aahlad et al. | |
| 2006/0206758 | A1 | 9/2006 | Butterworth et al. | |
| 2007/0180317 | A1 * | 8/2007 | Hirotsu et al. | 714/17 |
| 2008/0155321 | A1 * | 6/2008 | Riedlinger et al. | 714/17 |
| 2009/0276654 | A1 * | 11/2009 | Butterworth et al. | 714/1 |
| 2009/0313500 | A1 * | 12/2009 | Butterworth | 714/11 |

OTHER PUBLICATIONS

F. B. Schneider, "Implementing Fault-tolerant Services Using The State Machine Approach: A Tutorial"; ACM Computing Surveys, 22(4), Dec. 1990, pp. 299-319; and.
L. Lamport, "The Part-Time Parliament", Technical Report 49, DEC SRC, Palo Alto, 1989.

* cited by examiner

*Primary Examiner* — Philip Guyton
(74) *Attorney, Agent, or Firm* — Scully, Murphy & Presser, P.C.; Randy Bluestone, Esq.

(57) ABSTRACT

A method, system and article of manufacture are disclosed for error recovery in a replicated state machine. A batch of inputs is input to the machine, and the machine uses a multitude of components for processing those inputs. Also, during this processing, one of said components generates an exception. The method comprises the steps of after the exception, rolling the state machine back to a defined point in the operation of the machine; preemptively failing said one of the components; re-executing the input batch in the state machine; and handling any failure, during the re-executing step, of the one of the components using a defined error handling procedure. The rolling, preemptively failing, re-executing and handling steps are repeated until the input batch runs to completion without generating any exception in any of the components that are not preemptively failed.

20 Claims, 3 Drawing Sheets

CONTAINMENT AND RECOVERY OF SOFTWARE EXCEPTIONS IN INTERACTING, REPLICATED-STATE-MACHINE-BASED FAULT-TOLERANT COMPONENTS

BACKGROUND OF THE INVENTION

1. Field of the Invention

This invention generally relates to replicated state machines, and more specifically, to error recovery in replicated state machines. Even more specifically, the preferred embodiment of the invention relates to containment and recovery of software exceptions in interacting, replicated-state-machine-based, fault-tolerant components.

2. Background Art

Replicated state machines can be used to provide fault-tolerant services as described in F. B. Schneider, Implementing Fault-tolerant Services using the State Machine Approach: A Tutorial, ACM Computing Surveys, 22(4), December 1990, pp. 299-319. The above-mentioned reference defines distributed software as often being structured in terms of clients and services. Each service includes one or more servers and exports operations that clients invoke by making requests. Using a single centralized server is the simplest way to implement a service; however, the resulting service can only be as fault-tolerant as the processor executing that server. Multiple servers that fail independently can be used to provide a fault-tolerance service. Such is done by replicating the single server and executing the replicas on separate processors of a distributed processing system.

The state machine approach refers to a method of implementing a fault-tolerant service by replicating servers and coordinating client interactions with the server replicas. With the replicated state machine approach, the service is expressed as a deterministic state machine and copies of the state machine are executed in a number of different failure domains in parallel. For example, the copies of the state machine may be executed on several different computers in parallel. Clients express their requests in terms of state machine stimuli that are committed to a sequence of such stimuli using a distributed consensus protocol. An example of a distributed consensus protocol is the PAXOS protocol as described in L. Lamport, the part-time parliament, Technical Report 49, DEC SRC, Palo Alto, 1989.

The distributed consensus protocol ensures that all state machine replicas receive the same sequence of stimuli and since, by design, they all start off with the same state and are deterministic, the state machines continue to execute as replicas of one another indefinitely. Fault-tolerance is essentially achieved because each replica holds one copy of the state of the service so it does not matter if a subset of the replicas fail since a copy of the service state will be retained in a surviving replica.

The exact number of survivable failures and the type of failure that is survivable (fail-stop or Byzantine) are functions of the choice of distributed consensus protocol.

A hardware failure can be recovered and the system returned to normal operating condition by copying a snapshot of the state of a surviving replica to the replaced or repaired node and including it back into the distribution of the input sequence at the point in the sequence corresponding to the snapshot of the state that was restored to the node.

In general, it is also necessary to restore availability after simultaneous power loss to all nodes. Power failure is a special kind of failure because data committed by a node to stable storage is expected to be preserved across the power outage and can be used for recovery. The stable storage makes it possible to restore availability when power is restored, even if the power failure affected all nodes simultaneously.

The messages that make up the sequence of inputs to the software process are generally passed through the distributed consensus protocol in batches for efficiency. The replicas cannot actually execute in stable storage but it is possible to run an input batch through each replica in two phases with an intermediate commit such that if power fails before the commit, then when power is restored the replica is rolled back to the previous input batch boundary and the input batch is retried, or if power fails after the commit the replica is rolled forwards to the committed state and the input batch is discarded. This mechanism makes use of the stable storage to store a snapshot of the replica state at the commit boundary. For correct interaction with the world outside the replica, there is a requirement that the state is never rolled back after a response (an output from the state machine to the outside world) is made. This requirement may be satisfied in one of two ways: responses may be blocked during the first phase and allowed to proceed when the input batch is repeated on a second copy of the state for the second phase or alternatively, responses may be buffered during the first phase and released in the second phase after the commit.

The replicated state machine approach solves the problem of maintaining availability across hardware failures but it does not solve the problem of maintaining availability across failure in the software due to programming errors. In fact, all replicas will encounter a programming error at approximately the same time and all will fail approximately simultaneously. The San Volume Controller product of the International Business Machines Corporation (IBM) uses the replicated state machine approach to implement a central core of configuration and control code, which coordinates the behavior of a cluster of agents offering storage services. SVC solves the problem of software bugs in the replicated core using a mechanism called cluster recovery.

Software errors can only be recovered if they are detected so, as part of a general fail-fast approach, the SVC implementation makes use of 'assert' statements and the failure of an assertion causes a software exception.

SVC's cluster recovery mechanism works generally as follows. An exception in the replicated code is detected. All agents are stopped. The two-phase commit implementation is used to roll back each replica state to the previous input batch commit point. Subsequent input batches (including the one that would cause the exception if replayed) are flushed from the system. The replica state is reduced to a canonical form by discarding transient state associated with the (now reset) dynamic system operation and preserving any configuration state required to restart system operation. Communication between the replicated core and the cluster of agents is reset (to reflect that the agent-to-core messages in the flushed input batches have been lost). The system resumes execution in the same way it would ordinarily if power had failed and then been restored to all nodes simultaneously by restarting the agents and resuming the storage services.

Although there is no guarantee of successful recovery, in practice this mechanism generally works because the software exception was generally caused by an unusual combination of input-message and dynamic-state-of-the-core which forced the software down an unusual path that had never been tested with a specific set of parameters. When the system is resumed after cluster recovery, the input and the dynamic state has been discarded so the problem does not immediately reoccur and availability can be restored while the problem is debugged and a fix issued.

The drawback of this solution is that failure in any component in the replicated core is promoted to a cluster recovery event, which results in a temporary loss of availability of all storage services, including those not responsible for the software exception.

A solution is required which allows the software exception to be contained within the component responsible for the problem and recovered with minimal impact to the availability of other services.

A very difficult aspect of this problem is that the services in the fault-tolerant core are generally interrelated and may call on each other to perform actions which result in complex changes to the replicated state. With the SVC cluster recovery solution, the reset of the replicated state to canonical form is relatively simple because_all_ of the state is reset.

When the goal is to contain the failure, it is not possible to reset_all_ the state since some of the state is clearly required for the ongoing dynamic operation of the components that must be protected from the contained failure. Furthermore, since an exception can happen at any time, it is possible that a failing component is halfway through a series of requests to other components and the dynamic state of the other components would be left in an incompletely modified, inconsistent condition even if the state of the failing component was itself reset.

The generally accepted solution to this kind of problem is to use transactions which allow components to group together requests that they make of other components such that they are guaranteed that if they die, the set of changes will either all be committed or all be rolled out.

The significant disadvantage of transactions is that they complicate the APIs between components and therefore complicate the implementation.

Software transactional memory is a different existing technique which is used for concurrency control and eliminates the API complexity of transactions (which are used for concurrency control in addition to their use for restoring consistency after a software crash).

The Erlang programming language uses a concept called hierarchical supervision whereby a parent process watches its children to see if they encounter an exception. The parent process is responsible for performing an appropriate recovery action such as restarting the child process or generating an exception itself to force recovery at a higher level. Erlang is used in conjunction with the mnesia database that has a transactional API.

N-version programming is an approach that may be used in conjunction with a distributed consensus protocol to solve the problem of availability across software failures. This relies on the software bugs in multiple different implementations of the same software function being different and there being a quorum of correct implementations when a bug is encountered.

SUMMARY OF THE INVENTION

An object of this invention is to provide a method and system for recovery of software exceptions in replicated state machine based fault-tolerant software.

Another object of the present invention is to contain a software exception within the component responsible in componentized replicated state machine based, fault tolerant software.

A further object of the invention is to recover inconsistencies between components caused when an operation involving multiple interacting components is left unfinished due to a software exception in componentized, replicated state machine based, fault tolerant software.

A further object of the invention is to contain and recover software exceptions and the resulting inconsistencies between components with minimal impact to the ongoing operation of non-failing components in the system.

These and other objectives are attained with a method, system and article of manufacture for error recovery in a replicated state machine. At a defined time in an operation of the machine, a batch of inputs are input to the machine, and the machine uses a multitude of components for processing said inputs. Also, during said processing, one of said components generates an exception. The method comprises the steps of after the exception, rolling the state machine back to a defined point in the operation of the machine; preemptively failing said one of the components; re-executing the batch of inputs in the state machine; and handling any failure, during said re-executing step, of said one of the components using a defined error handling procedure. The rolling, preemptively failing, re-executing and handling steps are repeated until the input batch runs to completion without generating any exception in any of the components that are not preemptively failed.

In a preferred embodiment, component IDs are used to keep track of which components should be preemptively failed. In this embodiment, a respective one component ID is assigned to each of the components, and a fail-set is maintained of components that are to be preemptively failed during input-batch processing. For example, each of the components may receive a new ID when said each component is created, and as a result of a reset by a supervisor component after an exception. Preferably, the component ID for each component is sufficient to determine whether said each components was created during processing of the current input batch, or during processing of a previous input batch. Also, if said each component is created during processing of the current input batch, the component ID is also sufficient to determine whether said each component was created before or after any of the other components created during the processing of the current input batch.

The fail-set of components that are to be preemptively failed is preferably empty at the start of the processing of the input batch. In addition, in the preferred implementation of the invention, during the processing of the input batch, if any component is created that is on the fail-set, that component is preemptively failed on creation thereof. Also, during the processing of the input batch, if an exception is generated by one of the components, the component ID of that component is added to the fail-set.

In an alternative embodiment, the step of preemptively failing one of the components is done by forcing said one of the components into a pending state which causes requests in progress in that component and subsequent requests to be failed back to their originating components with an error return indicating that the request failed due to a component pending. The status of a pending component is resolved to online by successful recovery and to offline after a hard failure (for example after too many consecutive exceptions). An originating component may retry or abort the request once the pending status is resolved.

The preferred embodiment of the invention, described below in detail, uses a two phase commit infrastructure to roll-back to the previous input batch commit point (i.e. a snapshot of the replica taken before the exception occurred), and then preemptively fail the component responsible for the exception before it would otherwise reoccur during the next attempt at processing the input batch and before that component has an opportunity to make any requests to other components as a result of the input batch. Then the input batch is retried. Any interaction with the preemptively failed components during the input batch processing fails, (with a normal software error return), and the failure of the preemptively failed component is handled by its parent using a hierarchical supervision model. The technique is applied iteratively until the input batch runs to completion without generating an exception in any of the components that are left alive.

This preferred embodiment of the invention has a number of important advantages over the prior art error recovery procedures discussed above. For example, the advantage of this technique of this invention over the SVC cluster recovery process is that this invention allows an exception to be contained within the component responsible without promoting the failure to a failure of the entire fault tolerant core. The advantage of this technique over software transactional memory is that this invention is applicable to the problem of dealing with software crashes (rather than concurrency control). The advantage of this technique of the present invention over Erlang and mnesia is that this invention avoids a transactional API. The advantage of this technique over N-version programming is that this invention only requires one version of the software to be implemented and is therefore cheaper and also recovers without requiring a quorum of correct implementations (apparently N-version solutions often encounter bugs where none of the implementations agree).

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

A distributed computer system allows clients' request operations to be carried out by a service. The clients may be applications running on distributed processors in the form of client devices. The service is carried out by more than one server to provide a fault-tolerant system in the form of a replicated state machine.

Figure 1:
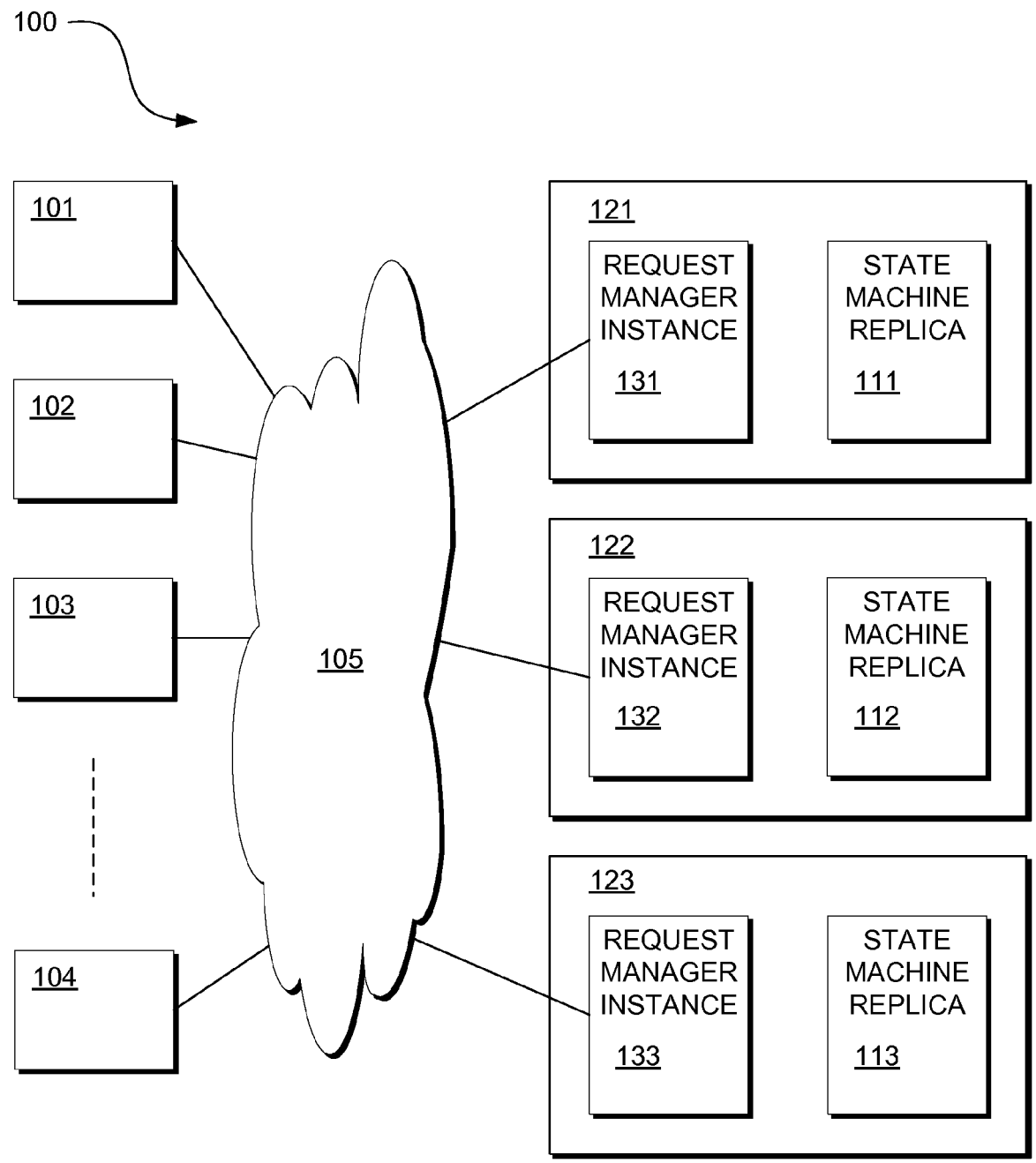
FIG. 1 is a block diagram of a distributed computer system in which a preferred embodiment of the invention may be implemented.

Referring now to the drawings and in particular to FIG. 1, there is depicted a block diagram of a distributed computer system in which a preferred embodiment of the present invention may be implemented. As shown, a distributed computer system 100 includes clients 101-104 that interact with a service via a network 105. In order to provide a fault-tolerant service, state machine replicas 111-113 are provided within distributed computer system 100. Each of state machine replicas 111-113 is respectively executed on a separate processor 121-123, and replicates an image of a single server providing a service to all of the clients.

Clients 101-104 submit their requests to a request manager component for servicing clients 101-104. Instances 131-133 of the request manager run for state machine replicas 111-113, respectively. A distributed consensus protocol is used to coordinate request manager instance interactions with state machine replicas 111-113.'

Figure 2:
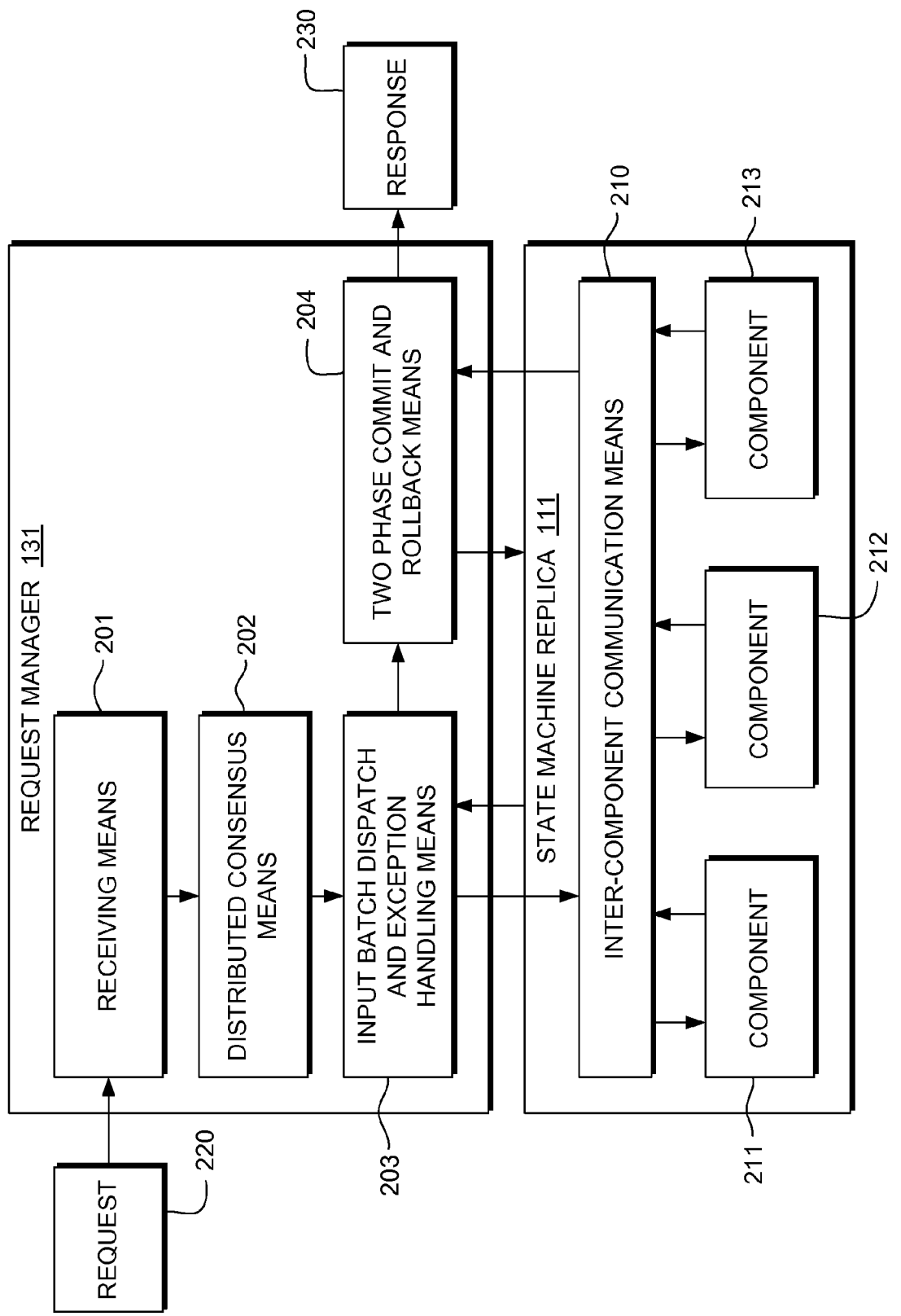
FIG. 2 is a block diagram of a request manager and a state machine replica of the distributed computer system of FIG. 1.

With reference now to FIG. 2, there is depicted request manager instance 131 that manages requests 220 to state machine replica 111. The requests can be sent from multiple clients, as shown in FIG. 1. Request manager instance 131 has a receiving means 201 for receiving requests from clients. A distributed consensus means 202 is provided on request manager instance 131 that performs the distributed consensus protocol in conjunction with other distributed consensus means instances on different processors 121-123 and passes the resulting committed sequence in the form of a succession of input batches to an input batch dispatch and exception handling means 203. The input batch dispatch and exception handling means 203 passes the input batch to an inter-component communication means 210 within the replica 111 and the inter-component communication means 210 distributes the batch of requests to the components 211-213 of the state machine replica.

During processing of requests from an input batch, components 211-213 of the state machine may communicate with each other over the inter-component communication means 210.

Input batch processing in the state machine replica either runs to completion when all of the requests in a batch have been processed or until a component generates an exception. In either case, the input batch dispatch and exception handling means 203 is notified and controls a two phase commit and rollback means 204 to either commit, roll forwards and move on to the next input batch, or in the event of an exception to roll back and retry the current input batch.

The two phase commit and rollback means 204 manages the replica state and, under control of the input batch dispatch and exception handling means 203, is capable of reverting the replica state to the previous committed version so that an input batch may be retried. Responses 230 output from state machine components 211-213 via the inter-component communication means 210 are gated by the two phase commit and rollback means 204 which ensures that output from input batch processing is not released until the commit point for the batch, when the batch has run successfully to completion and will not need to be retried.

The present invention, in its preferred implementation, provides a method and system for containment and recovery of software exceptions in interacting, replicated state-machine-based, fault tolerant components. This preferred implementation is used with a replicated state machine infrastructure that uses two phase commit as described above. It is also desirable for the replicated state machine infrastructure to support memory protection between multiple components in the replica. The invention may work often enough to be useful even without memory protection but memory protection is necessary to provide a guarantee that the surviving components have not been corrupted by a component that takes an exception.

In the preferred embodiment of the invention, components are assigned an ID. The ID is sufficient to determine whether the component was created during processing of the current input batch or processing of a previous batch; and if created during the current input batch, the ID is also sufficient to determine whether a component was created before or after any other component created during the same batch.

An example ID might comprise of a 2-tuple of the sequence number representing the index of the input batch in the sequence of batches since the system was created and the number of components created (or reset) so far during the processing of the current input batch at the time the component itself is created. A component receives a new ID on creation and as a result of a reset by a supervising component after an exception. Also, the replication manager maintains a set, referred to as the fail-set, of component IDs of components that must be preemptively failed during input-batch processing.

Figure 3:
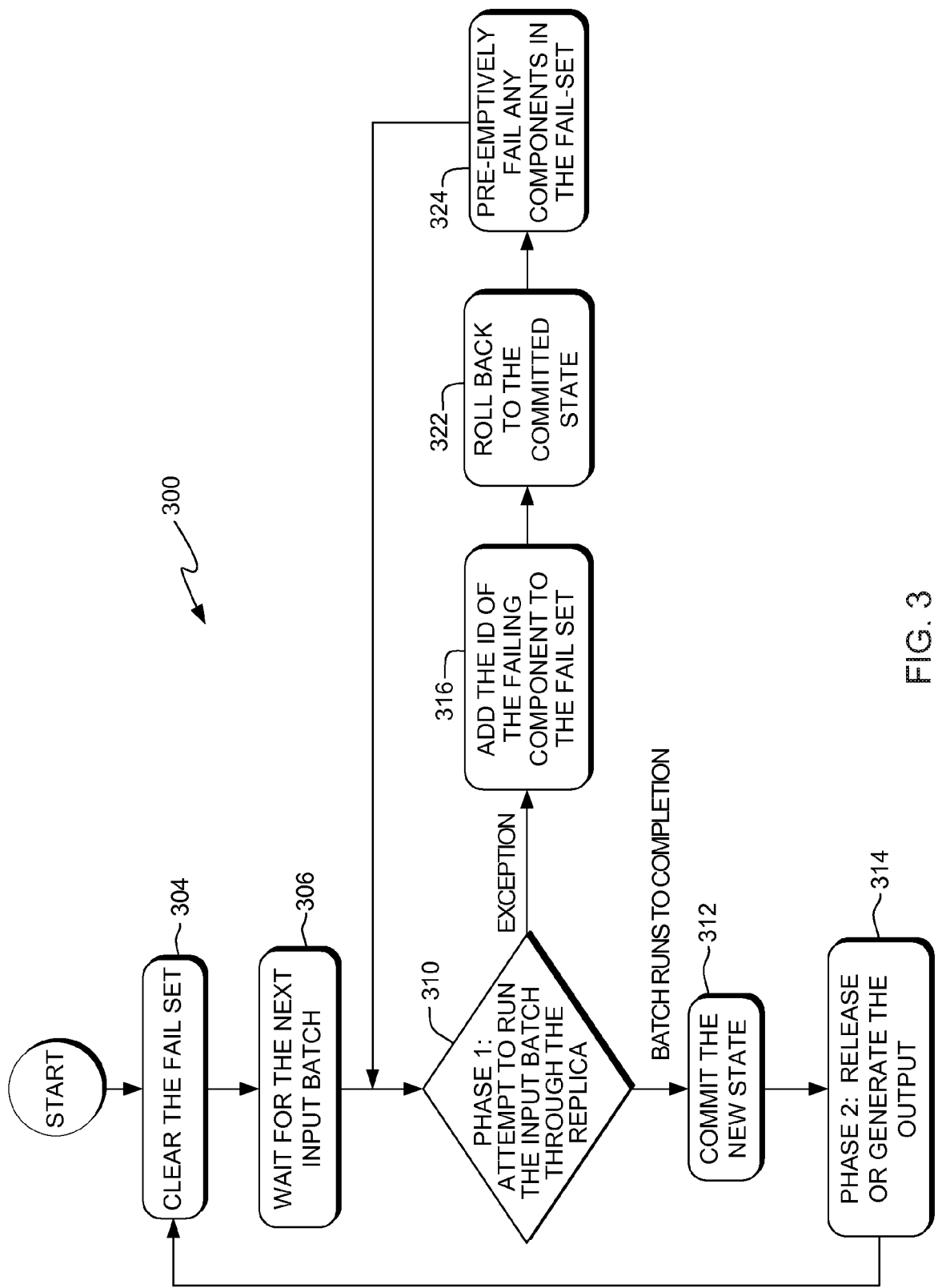
FIG. 3 is a flow diagram showing a preferred error containment and recovery procedure embodying the present invention.

FIG. 3 shows, as an example, a process 300 for carrying out a preferred embodiment of the invention. In this process, at step 304, the fail-set is cleared; and then, at step 306, the process waits for the next input batch. After an input batch is received, an attempt is made, at step 310, to run the input batch through the replica. If the batch runs to completion, without exception, then the process proceeds to step 312, where the new state (and optionally the final fail-set) is committed. At step 314, the second phase of the two-phase commit is performed (to generate the replica responses as usual) with the same preemptive failure mechanism as above using the final fail-set from phase one. Once the second phase is complete, the process returns to step 304, where the fail-set is cleared ready for the next input batch.

If, at step 310, an exception is encountered, the process moves on to step 316, where the ID of the failing component is added to the fail-set. Then, at step 322, the replica is rolled back to the committed state that corresponds to the start of the current input batch, and at step 324, the replica manager preemptively fails any components in the fail-set. From step 324, the process returns to step 310, and, again, attempts to run the input batch through the replica. Steps 310, 316, 322 and 324 are repeated until the input batch runs to completion without generating any exception in any of the components that are not preemptively failed.

During the run, if a component is created which is present in the fail-set, it is preemptively failed on creation before it is allowed to interact with the other components. Also, any IDs of components created during the current run and created after the exception-generating component are removed from the fail-set if present.

The overall behavior of the interacting components changes from one run attempt to the next as a result of the preemptive failures. Components created after a preemptive failure is injected may not be the same as the components that were assigned the same IDs in the previous attempt so the former components may be innocent of any exceptions recorded for those IDs in the fail-set of the previous attempt.

After a power failure and restoration, when it happens to be necessary to roll the two phase commit forwards, it is not necessary to generate the replica responses (messages to the agents) for phase two because they can be considered lost with the failure of the agents which are in the same power domain. Since it is not necessary to generate the responses, roll forwards can be performed by copying the phase one state to the phase two state. An optional alternative would be to commit the fail-set and roll forwards by performing phase two using the committed fail-set.

This preferred mechanism provides the guarantee to any component that it will either run to completion from one input batch boundary to the next, or that any changes made to the state of any component on its behalf during the input batch will be undone. Components therefore only need to ensure that operations which must be atomic are performed within an input batch (i.e. without requiring a replica response and a wait for new input), and components need only cope with failure returns from other components and do not need to explicitly program for the case where they themselves crash at an intermediate point in their operation.

This preferred mechanism contains an exception within the component that caused it, allowing the remaining components to continue operation and work as best as they can around the failed component by dealing with error return values. Also, this preferred mechanism deals iteratively with exceptions in the error handling paths of components provoked by having to deal with an already failed component. In addition, this preferred mechanism is compatible with hierarchical supervision, which allows failed components to be recovered by their parents resetting them.

The type of reset performed for recovery may be a complete reset or optionally a reset to a canonical form similar to that used by the SVC cluster recovery process. The former is useful for components that are only used for dynamic, non-critical state and the latter is useful for components that are trusted with critical state, for example the virtualization map of a storage virtualization appliance.

An optional improvement is for pre-emptive failure to force components into a pending state that is communicated to collaborating components before requests to the failed component are failed back to the collaborating components. The collaborating components may then queue requests until the hierarchical supervision recovery process resolves the pending status. The pending status would be resolved to online by an apparently successful recovery and to offline by a hard failure (for example after repeated exceptions). This improvement allows the collaborating components to retry after recovery is successful and avoid failing client requests unless a dependency component suffers a hard failure.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of error recovery in a replicated state machine, wherein, at a defined time in an operation of the machine, a batch of inputs are input to the machine, and the machine uses a multitude of components for processing said inputs, and wherein during said processing, one of said components generates an exception, the method comprising the steps of:

after the exception, rolling the state machine back to a defined point in the operation of the machine;
preemptively failing said one of the components;
re-executing the batch of inputs in the state machine;
handling any failure, during said re-executing step, of said one of the components using a defined error handling procedure, including using a second one of said components to handle said any failure in order to contain said exception within said one of the components; and
repeating the rolling, preemptively failing, re-executing and handling steps until the input batch runs to completion without generating any exception in any of the components that are not pre-emptively failed.

2. The method according to claim 1, wherein said defined point is at or prior to the defined time at which the batch inputs are input to the state machine.

3. The method according to claim 1, wherein the preemptively failing step includes the steps of: assigning a respective one component ID to each of the components; and maintaining a fail-set of components that are to be preemptively failed during input-batch processing.

4. The method according to claim 3, wherein said fail-set of components that are to be preemptively failed is empty at the start of the processing of the batch inputs.

5. The method according to claim 3, wherein the preemptively failing step includes the step of, during the processing of the batch inputs, if any component is created that is on the fail-set, preemptively failing said any component on creation thereof.

6. The method according to claim 3, wherein the preemptively failing step includes the step of, during the processing of the batch inputs, if an exception is generated by one of the components, adding the component ID of the component generating the exception to the fail-set.

7. The method according to claim 3, wherein:
the component ID for each component is sufficient to determine whether said each components was created during processing of the current input batch, or during processing of a previous input batch; and if said each component is created during processing of the current input batch, the component ID is also sufficient to determine whether said each component was created before or after any of the other components created during the processing of the current input batch.

8. The method according to claim 1, wherein each of the plurality of components has a parent component, and the step of handling any failure of said one component includes the step of using the parent of said one component to handle said any failure.

9. The method according to claim 1, wherein the preemptively failing step includes the step of forcing said one of the components into a pending state before requests to said one of the components are failed back to others of the components.

10. The method according to claim 1, wherein the preemptively failing includes:
keeping a list of all of the components that are preemptively failed; and
adding to said list all of the components that generate an exception during said repeating step.

11. A method of error recovery in a replicated state machine, wherein, at a defined time in an operation of the machine, a batch of inputs are input to the machine, and the machine uses a multitude of components for processing said inputs, and wherein during said processing, one of said components generates an exception, the method comprising the steps of:
after the exception, rolling the state machine back to a defined point in the operation of the machine;
preemptively failing said one of the components';
re-executing the batch of inputs in the state machine;
handling any failure, during said re-executing step, of said one of the components using a defined error handling procedure; and
repeating the rolling, preemptively failing, re-executing and handling steps until the input batch runs to completion without generating any exception in any of the components that are not preemptively failed;
wherein the preemptively failing step includes the steps of:
assigning a respective one component ID to each of the components; and
maintaining a fail-set of components that are to be preemptively failed during input-batch processing; and
wherein each of the components receives a new ID when said each component is created, and as a result of a reset by a supervisor component after an exception.

12. An error recovery system in a replicated state machine, wherein, at a defined time in an operation of the machine, a batch of inputs are input to the machine, and the machine uses a multitude of components for processing said inputs, and wherein during said processing, one of said components generates an exception, the error recovery system comprising:
a computer system including one or more processor units configured for:
after the exception, rolling the state machine back to a defined point in the operation of the machine;
preemptively failing said one of the components;
re-executing the batch of inputs in the state machine;
handling any failure, during said re-executing step, of said one of the components using a defined error handling procedure, including using a second one of said components to handle said any failure in order to contain said exception within said one of the components; and
repeating the rolling, preemptively failing, re-executing and handling steps until the input batch runs to completion without generating any exception in any of the components that are not preemptively failed.

13. The error recovery system according to claim 12, wherein the preemptively failing is done by:
assigning a respective one component ID to each of the components; and
maintaining a fail-set of components that are to be preemptively failed during input-batch processing.

14. The error recovery system according to claim 13, wherein:
each of the components receives a new ID when said each component is created, and as a result of a reset by a supervisor component after an exception; and
said fail-set of components that are to be preemptively failed is empty at the start of the processing of the batch inputs.

15. The error recovery system according to claim 13, wherein the preemptively failing step includes the steps of, during the processing of the batch inputs:
if any component is created that is on the fail-set, preemptively failing said any component on creation thereof; and
if an exception is generated by one of the components, adding the component ID of the component generating the exception to the fail-set.

16. The error recovery system according to claim 13, wherein:
the component ID for each component is sufficient to determine whether said each components was created during processing of the current input batch, or during processing of a previous input batch; and if said each component is created during processing of the current input batch, the component ID is also sufficient to determine whether said each component was created before or after any of the other components created during the processing of the current input batch.

17. An article of manufacture comprising:

at least one computer usable tangible medium having computer readable program code logic tangibly embodied therein to execute a machine instruction in a processing unit for error recovery in a replicated stat machine, wherein, at a defined time in an operation of the machine, a batch of inputs are input to the machine, and the machine uses a multitude of components for processing said inputs, and wherein during said processing, one of said components generates an exception, said computer readable program code logic, when executing, performing the following steps:

after the exception, rolling the state machine back to a defined point in the operation of the machine;

preemptively failing said one of the components;

re-executing the batch of inputs in the state machine;

handling any failure, during said re-executing step, of said one of the components using a defined error handling procedure, including using a second one of said components to handle said any failure in order to contain said exception within said one of the components; and repeating the rolling, preemptively failing, re-executing and handling steps until the input batch runs to completion without generating any exception in any of the components that are not preemptively failed.

18. The article of manufacture according to claim 17, wherein the preemptively failing step includes the steps of:

assigning a respective one component ID to each of the components; and maintaining a fail-set of components that are to be preemptively failed during input-batch processing.

19. The article of manufacture according to claim 18, wherein the preemptively failing step includes the step of, during the processing of the batch inputs:

if any component is created that is on the fail-set, presumptively failing said any component on creation thereof; and if an exception is generated by one of the components, adding the component ID of the component generating the exception to the fail-set.

20. The article of manufacture according to claim 17, wherein said defined point is at or prior to the defined time at which the batch inputs are input to the state machine.

* * * * *